United States Patent
Haldeman et al.

Patent Number: 6,010,544
Date of Patent: Jan. 4, 2000

[54] SUPERCRITICAL WATER FUEL COMPOSITION AND COMBUSTION SYSTEM

[75] Inventors: Charles W. Haldeman, Concord; Brian S. Ahern, Boxboro; Keith H. Johnson, Cambridge, all of Mass.

[73] Assignee: Quantum Energy Technologies, Woburn, Mass.

[21] Appl. No.: 08/992,983

[22] Filed: Dec. 18, 1997

[51] Int. Cl.$^7$ ................................................. C10L 1/32
[52] U.S. Cl. ............................................................ 44/301
[58] Field of Search ............................................... 44/301

[56] References Cited

U.S. PATENT DOCUMENTS

| | | | |
|---|---|---|---|
| 4,011,843 | 3/1977 | Feuerman | 44/301 |
| 4,114,566 | 9/1978 | Harpman et al. | 123/25 B |
| 4,116,610 | 9/1978 | Berthiaume | 44/301 |
| 4,158,551 | 6/1979 | Feuerman | 44/301 |
| 4,189,914 | 2/1980 | Marek et al. | 60/726 |
| 4,338,199 | 7/1982 | Modell | 210/721 |
| 4,408,573 | 10/1983 | Schlueter et al. | 123/25 P |
| 4,541,367 | 9/1985 | Lindberg | 123/25 M |
| 4,543,190 | 9/1985 | Modell | 210/721 |
| 4,558,664 | 12/1985 | Robben | 123/23 |
| 4,732,114 | 3/1988 | Binder et al. | 123/25 E |
| 4,907,368 | 3/1990 | Mullay et al. | 44/301 |
| 4,908,154 | 3/1990 | Cook et al. | 44/301 |
| 4,909,192 | 3/1990 | Förster et al. | 123/25 C |
| 4,986,223 | 1/1991 | Mahoney | 123/25 B |
| 5,125,367 | 6/1992 | Ulrich et al. | 123/25 E |
| 5,170,727 | 12/1992 | Nielsen | 110/346 |
| 5,419,852 | 5/1995 | Rivas et al. | 44/301 |
| 5,503,772 | 4/1996 | Rivas et al. | 44/301 |
| 5,505,876 | 4/1996 | Rivas et al. | 44/301 |
| 5,603,864 | 2/1997 | Silva et al. | 44/301 |
| 5,725,609 | 3/1998 | Rivas et al. | 44/301 |
| 5,800,576 | 9/1998 | Johnson et al. | 44/301 |

FOREIGN PATENT DOCUMENTS

| | | |
|---|---|---|
| 406137218A | 5/1994 | Japan . |
| WO 97/03279 | 1/1997 | WIPO . |

*Primary Examiner*—Ellen M. McAvoy
*Attorney, Agent, or Firm*—Choate, Hall & Stewart

[57] ABSTRACT

Supercritical water fuel composition and combustion system. In one aspect, the invention is a composition of matter comprising a mixture of 5–50% water and a hydrocarbon wherein the water/hydrocarbon mixture is near the critical point such that the mixture is a homogeneous single phase. A suitable temperature is 400° C. and a suitable pressure is 4,000psi. In another aspect, the invention is a fuel system including structure containing a water/hydrocarbon fuel mixture near the critical point such that the mixture is a homogeneous single phase. Structure is provided for delivering the mixture for combustion. Combustion may occur in an internal combustion engine, turbine engine or other burner.

25 Claims, 2 Drawing Sheets

SUPERCRITICAL WATER FUEL COMPOSITION AND COMBUSTION SYSTEM

BACKGROUND OF THE INVENTION

This invention relates to a combustion system and more particularly to a combustion system utilizing a supercritical water/fuel composition.

The recently enacted clean air legislation has targeted fossil fuel emissions. This legislation has prompted both the engine manufacturers and the fuel providers to look for solutions to be able to continue selling their products. Refiners must look at alternative formulations and/or blends to reduce emissions. Engine designers on the other hand, must rethink the entire combustion process and how it is conducted from beginning to end.

Engine manufacturers are going to higher tolerances on the piston—wall machining to reduce engine oil burning. Additionally, they are moving to higher and higher injection pressures. The higher pressures result in better spray penetration into the combustion zone as well as finer droplet sizes. The higher pressures permit smaller orifices at the injector tips while still maintaining the same mass flow rate.

With newly developed injectors operating at up to 30,000 psi, the droplet size is reduced but the droplet dimensions are still in the 1–10 micron range. A droplet size reduction by a factor of two would necessarily be accompanied by an increase in droplet number by a factor of eight from a mass balance perspective. This is important because many small droplets improve the microscopic homogeneity and reduce particulate matter production. Unfortunately, the droplet size reduction at these extreme pressures is less than a factor of two over the standard 3800 psi systems.

By way of example, a 2 micron diameter droplet occupies $3 \times 10^{-12}$ cm$^3$ and one mole of diesel fuel occupies 300 cm$^3$. Therefore, this size droplet still contains $10^{-14}$ moles of fuel molecules, or $6 \times 10^{+9}$ molecules. It is clear that even these smaller droplets still present a challenge to completely evaporate and combust. An additional mechanism beyond pressure increases must be found.

It is well known in the art that droplet size is primarily related to the surface tension of the fluid. Therefore, any process that reduces the surface tension can potentially reduce the droplet size. A chemical approach to droplet size reduction can be found in surfactant technology. Surface tension reducing additives have been applied, but their efficacy has been limited by high cost. Clearly, other chemical approaches are called for.

It is well known in the art that addition of heat to a hydrocarbon fuel reduces its surface tension. Thus, preheating of the fuel has some appeal from both an emissions and fuel economy perspective. In practice however, heating leads to premature reformulation of the fuels into higher as well as lower molecular weight compounds. The fuel's viscosity increases at a rate that outpaces the drop in surface tension and a sticky, tarry residue is produced. Therefore, simple preheating of hydrocarbon fuels has limited use.

There are however, additives that can alter this tendency toward molecular weight increases upon heating. Water for example, promotes the opposite process whereby hydrocarbon fuels are reduced in molecular weight by partial conversion to $H_2$ and CO gases and reduction of chain length. Therefore, water and fuels mixed together and heated offer an economical solution to droplet size reduction. Additionally, the reformulated $H_2$ provides cetane enhancement as it possesses a wider flammability limit. $H_2$ gas in limited quantities has beneficial qualities, because the wider flammability limits can ignite at lower oxygen concentrations. These $H_2$ molecules thereby serve as combustion initiators that are well distributed in the reaction zone.

Water addition to heated fuels offers benefits, but water and hydrocarbons do not mix readily. The polar nature of water and the nonpolar character of fuels favors phase separation into two unmixed pure liquids. Water does not exhibit an antibonding interaction with fuels. It simply has an overwhelmingly strong attraction for other water molecules that precludes bonding with hydrocarbon units. This phase separation property can be ameliorated by the addition of surfactants and cosurfactants, but as already stated they are expensive.

SUMMARY OF THE INVENTION

According to one aspect, the invention is a composition of matter comprising a mixture of 5–70% water and a hydrocarbon and preferably 5–50% water and more preferably 20–40% water for engine applications wherein the water/hydrocarbon mixture is near or above the critical point such that the mixture is a homogeneous single phase. Lower amounts of water are preferable for engines and higher amounts of water are preferable for burners and combustors. The mixture is in the temperature range 350–500° C. and preferably in the range 350–400° C. and a pressure in the range 3000–6000 psi and preferably in the range of 3000–4000 psi. In another aspect, the invention is a fuel system including structure containing a water/hydrocarbon fuel mixture near or above the critical point such that the mixture is a homogeneous single phase. Structure is provided for delivering the mixture for combustion. Combustion may be in an internal combustion engine, turbine engine or other burner. In one embodiment, an injector is provided for delivering the mixture into an internal combustion engine, either a spark ignition engine or a diesel-type engine. It is preferred that the injector be controlled electrically through a magnetically actuated armature adapted to open an injection port based on engine crank angle.

In order for the water/fuel mixture to be near its critical point, the mixture is maintained at approximately 400° C. and at a pressure of approximately 4000 psi. The high pressure is provided preferably by a dual piston metering pump and the injector is maintained at the approximately 400° C. utilizing a heat pipe to transfer heat from the exhaust manifold of the engine. Auxiliary electric heaters may also be provided.

Because the water/hydrocarbon fuel mixture is maintained as a homogeneous isotropic single phase it will combust more completely when introduced into a combustion chamber. More complete burning takes place because liquid droplets are eliminated. The improved burning reduces particulate matter formation. The more homogeneous dispersion of fuel molecules in air results in lower nitrous oxide emissions and nitrous oxides are further reduced by the lack of droplet surface catalysis of reaction pathways. The faster, more complete combustion cycle also lowers emissions of carbon monoxide, unburned hydrocarbons and volatile organic and polyaromatic hydrocarbons.

DESCRIPTION OF THE PREFERRED EMBODIMENT

Figure 1:
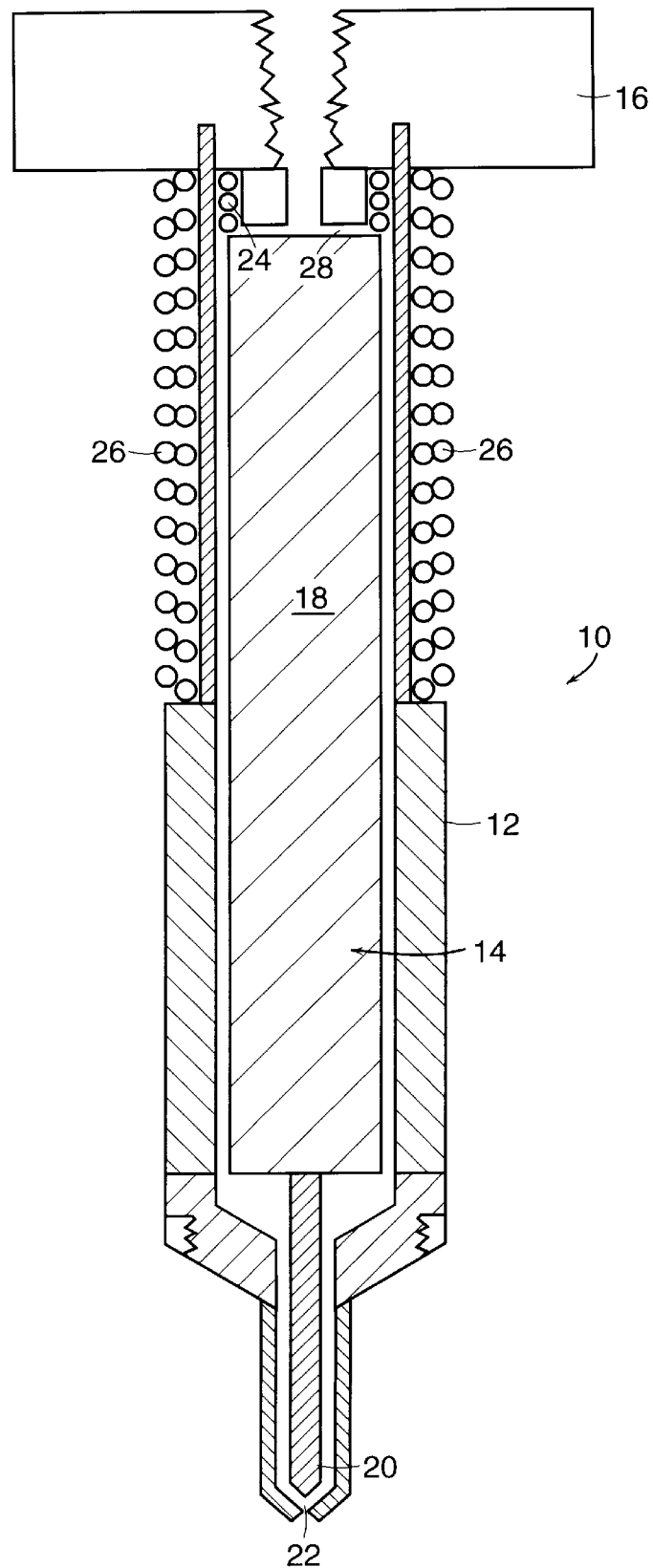
FIG. 1 is a cross-sectional view of an injector according to the invention.

As discussed earlier, water added to heated fuels offers combustion benefits but water and hydrocarbons do not mix readily. The most desirable way to realize the mixing of these two insoluble liquids is to go to high pressures and temperatures. At high enough pressures and temperatures supercritical conditions promote solvation while at the same time prohibiting tar formation. Supercriticality is defined as the point at which the heat of vaporization becomes zero. Once dissolved this supercritical mixture has optimum properties for combustion.

The supercritical phase is a dense gas that is partially shifted to convert some of the reactants into $H_2$ and CO gases. These gases along with the hydrocarbons themselves exit a supercritical injector without passing through a liquid phase. As such, the concept of droplet atomization is completely eliminated from the reaction pathways. When cylinders are large and the jet of supercritical gas will not penetrate to a sufficient distance from the injector, the temperature can be lowered a few degrees to the point where higher density sub-critical liquid is expelled. The jet then flash evaporates as it enters the cylinder. The interposed water molecules and water clusters provide catalytic surfaces for heterogeneous reactions. The $H_2$ gases are easily ignited and the ignition delay period is reduced. Accordingly, supercritical mixing raises the "effective cetane number" for the fuel mixture.

The cetane value of diesel fuel is a parameter used to measure the flammability of the fuel. It is the exact opposite of the term octane in gasoline. In spark ignited combustion premature ignition is undesirable and hard to ignite fuels are desirable. The higher the octane rating the higher the compression ratio that can be employed and hence higher power output.

Diesel engines, on the other hand, rely on the auto ignition of the fuel via the interaction with heated intake air. The air is adiabatically heated during the compression stroke to over 700° C. and fuel is injected near top dead center. Combustion ensues at a rate controlled by the fuel's cetane rating. Higher cetane fuels ignite sooner and provide more power along with improved specific fuel consumption.

Supercritical mixing of diesel fuels and water alters the cetane rating implicitly. The water not only solvates the fuel molecules, but also reforms some fraction into CO and $H_2$ via the water shift reaction. In general, supercritical mixtures of hydrocarbons and water are subject to pyrolysis, hydrolysis, steam reforming, water gas shift reactions, methanation and hydrogenation to some extent.

The cetane enhancement reduces ignition delay and extends the period of combustion. The temporal evolution of the pressure-volume characteristics can be quite different as the intimately mixed water may catalyze reaction along new coordinates. Reduced ignition delay means that fuel injection can be delayed and higher efficiencies anticipated.

The supercritical combustion event is not expected to include reactions at the surface of liquid droplets. The complete elimination of surface tension under these conditions negates the possibility of droplet formation at air temperatures near the injector which generally exceed 800° C. Without droplet formation the entire nature of the combustion process is altered. As a result, local hot spots that promote NO formation are eliminated as there is no focused reaction at a droplet surface.

The removal of droplets is also expected to eliminate nucleation sites for particulate matter formation and thereby prohibit soot formation. This second benefit further reduces the failure modes for lubrication oils as soot is no longer incorporated into oil films along the cylinder walls. Reduction of soot formation can therefore be expected to reduce maintenance costs and reduce down-time of heavy duty diesel engines.

The very high density of individual molecules in a supercritical fluid offers desirable reaction enhancing properties. These properties are directly related to the improved transport of reactants as the diffusivity of a dense gas is orders of magnitude greater than in a liquid state. The changes in reaction rates and reaction byproduct yield near the critical point of the water fuel mixtures can therefore be accomplished at higher rates and even along different reaction coordinates.

Transport properties have been observed to vary by 3–4 orders of magnitude near $T_{crit}$. Above the critical temperature certain reaction byproducts are favored by increases in pressure whereas reactions that produce a liquid have reduced reaction rates. The reaction rates are not merely increased because the thermophysical properties are enhanced. Intrinsically different reaction coordinates begin to compete and shift the product concentration profiles. Normally, increasing the pressure of a gaseous system does not affect the chemical properties. Ideal gases remain ideal under pressure increases. Van der Waals gases remain weakly interacting. But critical fluids have a richness of detail that can only be accounted for by delocalized bonding interactions.

Experiments

Mixtures of water and diesel were admitted into a hermetic, high pressure chamber and heated at 2° C./minute. Water has a density of about 1 gram/cm$^3$ below the critical temperature of 374° C. with a critical pressure of about 3250 psi. Diesel fuel has a wide range of molecular weight compounds and as such does not have a well defined critical temperature.

The first experiment established a constant pressure of 2,000 psi and the mixture was heated beyond the $T_c$ of water to 400° C. At 2,000 psi and 400° C. the pressure is too low and the temperature is too high to maintain water in the liquid state. And a dense gas forms on top of the still liquefied diesel fuel and no complete mixing is observed.

The fact that the diesel fuel retained its liquid properties at 400° C. says something about its supercritical temperature. Adding more thermal energy to a diesel fuel without water included would break many bonds before turning to a combination of a dense gas and heavy residue.

In a second experiment, the pressure was maintained at 3,000 psi while the mixture was heated at 2° C./minute. Surprisingly, at 363° C. the two fluids mixed completely and formed a supercritical fluid. It is of interest to note that this phase change occurred below the supercritical conditions for both water and diesel as separate fluids.

This second experiment suggested that the role of pressure was paramount to the reaction chemistry. The solvating power of the water increases by orders of magnitude within a specific range of pressure and temperature.

A third experiment was made to examine aspects of this pressure parameter on the nature of supercritical chemistry. The pressure was increased to 4,000 psi and once again the temperature of the reaction vessel was increased at a rate of 2° C./minute. In this instance, the temperature at which both liquids mixed supercritically was increased to 378° C. The supercritical mixing temperature was increased from 363°

C. up to 378° C. by the addition of 1,000 psi. This counterintuitive trend suggests that there is an optimal pressure and temperature point for a given water fuel mixture and this phase stability relationship is the subject of continuing research.

These experiments suggest that a fuel injector system for a diesel engine operating in the range of 4,000 psi and 400° C. will provide significant advantages. One advantage is that the higher temperature will provide less ignition delay and will add enthalpy to the combustion process. Expanding the supercritical fuel mixture like a gas into the heated air in the cylinder provides better mixing and combustion at a molecular level and eliminates the time required for droplet evaporation. Use of exhaust heat to provide the required temperatures creates a thermodynamic regeneration which adds several percent to engine cycle efficiency in addition to accompanying improvements in emissions as a result of faster, more complete combustion.

The observation of supercritical mixing combined with other measurements on the beneficial effects of water on combustion characteristics suggest certain strategies for enhancing combustion of hydrocarbon fuels. These fuels include, but are not limited to: gasoline, diesel fuel, heavy distillates, bunker C, kerosene, natural gas, crude oil, bitumen or any carbon containing material such as biomass. All of these hydrocarbon aggregations can be favored by mixing with water at or near supercritical conditions. As such, new refinery processes for fuel reformulation are permitted by judicious control of pressure, temperature and water content.

Fuel injection systems in high speed internal combustion engines inject fluids at high pressure in a rapid pulse that must be accomplished in a very short time interval. Injection periods are generally on the order of one millisecond and the quantity of fuel delivered is metered by various schemes. In virtually all of these systems the pressure pulse relies on the incompressibility of the liquid phase. Very small movements are required to make small volumetric changes in the dense liquid phase. Furthermore, the pressure pulses are conducted through the liquids at the speed of sound in the liquid phase which is generally above 1,000 meters/second.

These small volumetric changes are generally accomplished by a physical means where a cam shaft translates a piston in a pump to increase the pressure in a confined space. The pressure increase relies on very tight tolerances in sliding components that prevent the escape of the fluids by the sliding fit.

Furthermore, in virtually all injection systems, the external sealing components are composed of a carbonaceous material such as viton, buna N, teflon, plastic etc. None of these materials is capable of withstanding the temperature contemplated for supercritical water/fuel injection. Therefore some means must be provided for actuating a motion without the need for sliding seals or tight tolerances.

A supercritical mixture will not possess the same pressure transfer properties as a liquid. It is orders of magnitude more compressible. As a result, alternative strategies must be employed to actuate the fluid delivery. The delivery is further complicated by the fact that the sliding seals must seal a against a gas rather than a liquid. Leakage is, therefore, a much more serious problem with a supercritical fluid.

With reference to FIG. 1, an injector 10 circumvents the high temperature sealing problem by eliminating seals altogether. The injector 10 comprises a hermetically sealed enclosure 12 within which is disposed a magnetically activated needle valve assembly 14. A suitable material for the enclosure 12 is 17-4PH stainless steel which is closed by a magnetic iron cap 16 threaded on the top of the enclosure 12 sealed by copper gasket (not shown). The magnetically activated needle valve assembly 14 includes a magnetic iron armature 18 which is square shaped with rounded corners that fit within the internal diameter of the enclosure 12. The lower end of the assembly 14 includes a pintle valve 20 which normally closes the injector tip opening 22. The pintle 20 extends out of the small threaded end of the injector assembly 10 into the injector nozzle where it is held by spring 24. The spring 24 keeps the pintle 20 in contact with the opening 22 when the injector 10 is in its closed state. A two-layer solenoid of approximately 130 turns of number 14 magnet wire 26 is wound around an upper portion of the injector 10. The magnet wire 26 is insulated with 3M Nextel ceramic fiber. The upper portion wound with the magnetic wire 26 is approximately 5 inches long. The magnetic iron cap 16 is screwed onto the structure leaving a gap 28 of approximately 0.030 inch between the armature 18 and the cap assembly 16.

The injector assembly 10 is actuated by a pulse width modulated 50 ampere pulse timed to, for example, a crankshaft of an engine. The timing and width of the pulse are varied to control the start of the injection and length of injection time. For corrosion protection all magnetic iron parts are protected with 300–600 microinches of electroless nickel plate as is common in the plating art.

Figure 2:
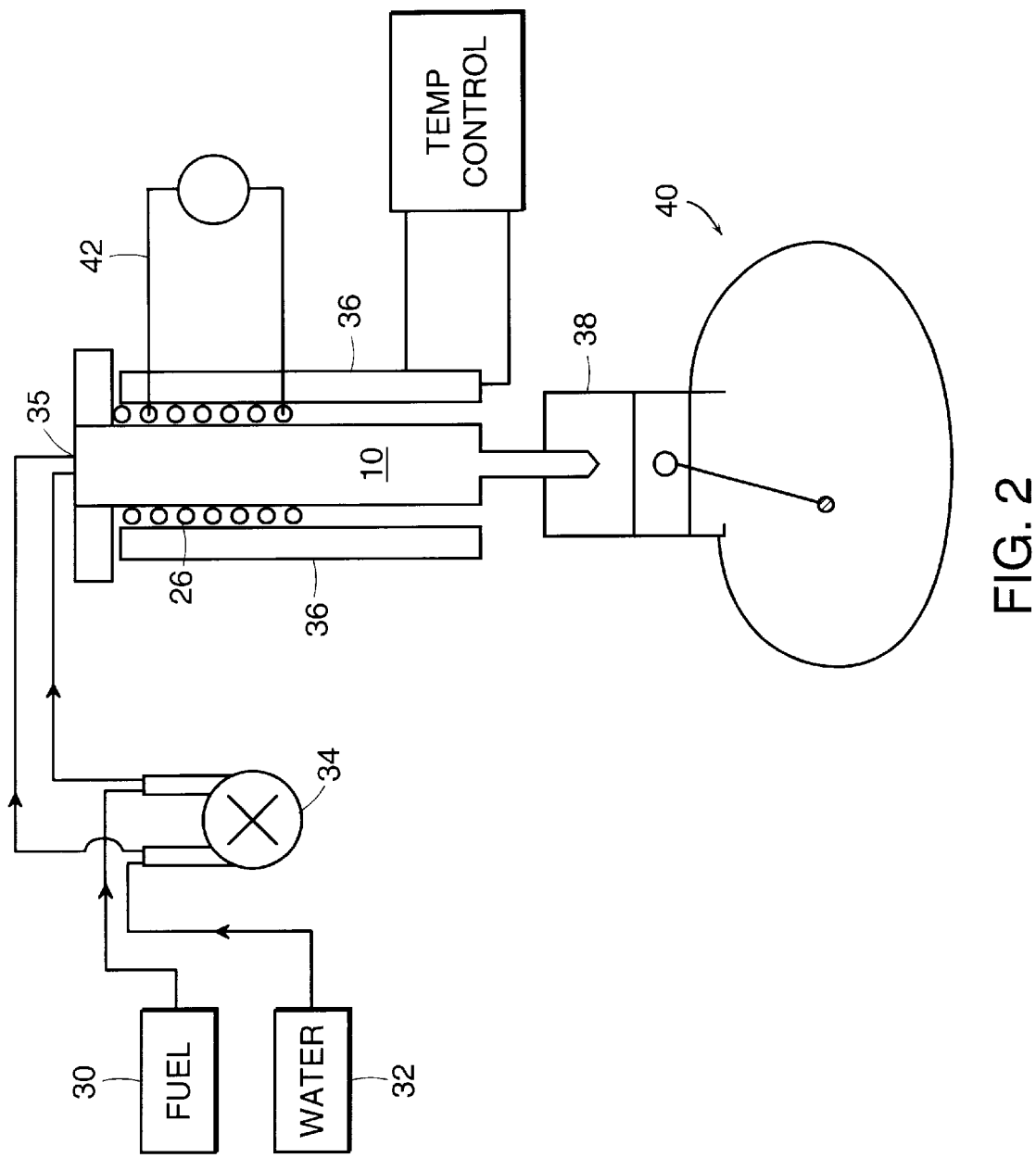
FIG. 2 is a schematic illustration of the supercritical water/fuel combustion system.

FIG. 2 is a schematic illustration of an embodiment of the invention utilizing the injector 10 of FIG. 1. A supply of fuel 30 and a supply of water 32 are connected to a pressure-limited dual-piston metering pump 34 which delivers water and fuel to an inlet 35 of the injector 10. The pump 34 provides the water and fuel at high pressure, approximately 4,000 psi. The injector 10 is heated to approximately 400° by a heating jacket 36 which may be electrically powered or, more preferably, heated by a heat pipe (not shown) in contact with a heated exhaust manifold of an engine. The tip of the injector 10 is disposed to inject the homogeneous fuel/water mixture into the combustion chamber 38 of an engine 40. A power supply 42 is provided to energize the coil 26 and is timed with respect to the crankshaft 44 of the engine 40 to control fuel delivery. A temperature controller 46 maintains the appropriate temperature of the injector 10 so that the fluid therein is maintained at near supercritical conditions.

Combining the enhanced solvating power of supercritical water along with the enhanced transport properties of a dense gas are desirable from a chemical reaction perspective. Reformulation chemistry is promoted by elevated temperatures, but the reaction rates are often limited by the diffusivity of species to and from a heterogeneous catalytic surface. The diffusivity of a dense, supercritical gas is 3–4 orders of magnitude higher than a typical liquid. Correspondingly, the super density of the gas at these supercritical pressures maintains a density of nearly 60% that of the liquid state so product throughput can remain high.

Supercritical reaction chemistry is particularly valuable in fractionation columns because the solubility of species is a strong function of temperature and pressure. In general supercritical fluids shows solubilities that are quite unlike subcritical conditions. For example, salts that are highly soluble in hot water become insoluble above the critical temperature and precipitate out. Conversely, insoluble materials like hydrocarbons now dissolve readily above some critical temperature and pressure.

The present technology has application for both mobile and fixed applications. For example, the fuel injection system of the invention could be used in the combustor of a gas turbine or jet engine as used in aircraft, marine, automotive or stationary power applications. When heat from the exhaust system is used to provide heat for the injector there results a heat regeneration cycle that extracts useful energy from the exhaust system which adds additional enthalpy to the combustion cycle near the peak of the compression cycle. The technology can also be used for processing heavy distillate fuels such that different molecular weights are selectively extracted according to pressure and temperature gradients within the supercritical reaction vessel. The technology can also be used for combusting fuels with higher molecular weight than kerosene and diesel fuel by the super solvating capability of the supercritical water. In another embodiment, natural gas may be admitted into the supercritical and reformed mixture such that the mixture becomes hypergolic and autoignites in a compression engine without the need for pilot injection of a second fuel.

In another embodiment, the fuel injection system utilizes a flexible membrane forming a bellows-like structure for sealing the high pressure, high temperature mixture. A cam controls the motion of a valve acting through the flexible membrane.

What we claim is:

1. Composition of matter comprising a mixture of 5–70% water and a hydrocarbon wherein the water/hydrocarbon mixture is at or above the critical point such that the mixture is a homogeneous single phase.

2. The composition of claim 1 wherein the mixture is at a temperature above 363° C. and the pressure is above 3,000 psi.

3. The composition of claim 1 wherein the temperature of the mixture is in the range of 363° C.–400° C. and the pressure is in the range of 3,000 psi–4,000 psi.

4. The composition of claim 1 wherein the hydrocarbon is a hydrocarbon fuel.

5. Fuel system comprising:
   structure containing a mixture of 5–70% water and hydrocarbon fuel wherein the mixture is at or above the critical point such that the mixture is a homogeneous single phase; and
   means for delivering the mixture into a combustion chamber.

6. The system of claim 5 wherein the structure containing the mixture comprises an injector including a valve for delivering the mixture into a combustion chamber.

7. The system of claim 6 further including a high pressure metering pump for delivering the water and the hydrocarbon fuel to the injector.

8. The system of claim 6 wherein the injector is controlled electrically to deliver fuel into the combustion chamber.

9. The system of claim 8 wherein the combustion chamber is the combustion chamber of an engine having a crankshaft and the electrical control of the injector responds to crankshaft angle.

10. The system of claim 9 wherein the engine is a diesel engine.

11. The system of claim 9 wherein the engine is a spark ignition engine.

12. The system of claim 9 wherein the engine is a gas turbine engine.

13. The system of claim 8 wherein the electrical control of the injector comprises pulse width modulation.

14. The system of claim 11 wherein the injector valve opens into the intake port or throttle body of a spark ignition engine and the fuel is gasoline, naptha, alcohol, light fuel oil or mixtures thereof.

15. The system of claim 9 wherein heating of the injector includes using heat from exhaust from the engine.

16. The system of claim 15 further including a heat pipe for heat transfer from engine exhaust to the injector.

17. The system of claim 6 wherein the injector comprises a flexible membrane forming a bellows sealing the water/hydrocarbon mixture and further including a mechanical cam to control the motion of the injector valve.

18. A fuel injection system for a furnace or power plant burner system comprising means for injecting a mixture of 5–70% water and hydrocarbon fuel into the burner system wherein the mixture is at or above the critical point such that the mixture is a homogeneous single phase.

19. The system of claim 6 further including electrical means for heating the injector.

20. Fuel system comprising:
   a source of water;
   a source of hydrocarbon fuel;
   a dual fluid, pressure limited high pressure metering pump having an inlet connected to the source of water and source of hydrocarbon and having an outlet;
   an injector volume connected to the pump outlet for receiving high pressure water and hydrocarbon fuel, the injector volume including heating means to heat a water/hydrocarbon fuel mixture, the mixture having 5–70% water, the injector volume further including a control valve to control discharge of the water/hydrocarbon fuel mixture, the temperature and pressure of the water/hydrocarbon fuel mixture being at or above the critical point such that the mixture is a homogeneous single phase.

21. The fuel system of claim 20 further including an internal combustion engine for receiving the mixture, the engine having a crankshaft and wherein the control valve is actuated in response to the crankshaft angular position.

22. The fuel system of claim 21 wherein the engine is a spark ignition engine.

23. The fuel system of claim 21 wherein the engine is a compression ignition engine.

24. The fuel system of claim 20 wherein the mixture is introduced into a powerplant gas turbine engine.

25. The fuel system of claim 20 wherein the water/hydrocarbon fuel mixture is above 363° C. and in the pressure range of 3000–4000 psi.

* * * * *